United States Patent
Zehnle et al.

(10) Patent No.: US 7,403,755 B2
(45) Date of Patent: Jul. 22, 2008

(54) SEARCHING RECEIVER

(75) Inventors: Guido Zehnle, Gaggenau (DE); Werner Conzelmann, Straubenhardt (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 329 days.

(21) Appl. No.: 10/777,884

(22) Filed: Feb. 12, 2004

(65) Prior Publication Data

US 2004/0176061 A1 Sep. 9, 2004

(30) Foreign Application Priority Data

Feb. 13, 2003 (EP) .................................. 03003126

(51) Int. Cl.
*H04B 1/18* (2006.01)
(52) U.S. Cl. .............. 455/186.1; 455/180.1; 455/179.1; 455/187.1
(58) Field of Classification Search .............. 455/186.1, 455/180.1, 179.1, 187.1, 191.1, 3.05, 184.1, 455/185.1, 45; 725/135, 139
See application file for complete search history.

(56) References Cited

U.S. PATENT DOCUMENTS

| | | | | |
|---|---|---|---|---|
| 4,737,993 A | * | 4/1988 | DeVilbiss | ................. 455/180.1 |
| 5,393,713 A | * | 2/1995 | Schwob | ................... 455/186.1 |
| 5,434,626 A | * | 7/1995 | Hayashi et al. | ............. 348/569 |
| 5,471,662 A | * | 11/1995 | Shiota | ...................... 455/184.1 |
| 5,671,195 A | * | 9/1997 | Lee | ................................ 369/7 |
| 5,699,409 A | * | 12/1997 | Kojima | ........................ 455/434 |
| 5,734,444 A | | 3/1998 | Yoshinobu | |
| 5,797,087 A | * | 8/1998 | Lee | .......................... 455/181.1 |
| 5,819,166 A | * | 10/1998 | Kimura et al. | ............ 455/186.1 |
| 5,940,746 A | * | 8/1999 | Otting et al. | .............. 455/161.3 |
| 6,141,536 A | * | 10/2000 | Cvetkovic et al. | .............. 455/45 |
| 6,411,800 B1 | * | 6/2002 | Emerson, III | ............. 455/186.1 |
| 6,615,043 B1 | * | 9/2003 | van de Berg | .............. 455/185.1 |
| 6,628,930 B1 | | 9/2003 | Vogt et al. | |
| 6,697,607 B1 | * | 2/2004 | Smith et al. | ............... 455/185.1 |
| 6,748,237 B1 | * | 6/2004 | Bates et al. | ............... 455/186.1 |
| 6,847,802 B2 | * | 1/2005 | Migliaccio | ................ 455/186.1 |
| 7,283,180 B2 | * | 10/2007 | Choi | .......................... 348/730 |
| 2001/0017598 A1 | * | 8/2001 | Townsend et al. | ......... 342/357.1 |
| 2002/0120943 A1 | * | 8/2002 | Seto et al. | .................... 725/135 |
| 2003/0083054 A1 | * | 5/2003 | Francesca et al. | ............ 455/418 |

(Continued)

FOREIGN PATENT DOCUMENTS

JP 2001-238141 * 8/2001

(Continued)

OTHER PUBLICATIONS

"Digital Audio Broadcasting (DAB; Guidelines and rules for implementation and operation; Part 2: System features", ETSI Technical Report, No. TR 101496-2, dated May 2001, pp. 98-109, XP002240095.

(Continued)

*Primary Examiner*—Lana N. Le
(74) *Attorney, Agent, or Firm*—Brinks Hofer Gilson & Lione

(57) ABSTRACT

A monitoring receiver accepts program preferences from an operator. When active, the receiver automatically monitors alternate frequencies for programming that matches the program preferences, alerts the operator when a match is found, and may switch to a preferred program.

20 Claims, 6 Drawing Sheets

U.S. PATENT DOCUMENTS

| | | | |
|---|---|---|---|
| 2004/0044902 A1* | 3/2004 | Luthi | 713/200 |
| 2005/0020223 A1* | 1/2005 | Ellis et al. | 455/186.1 |
| 2005/0166257 A1* | 7/2005 | Feinleib et al. | 725/135 |
| 2006/0082690 A1* | 4/2006 | Englert | 348/731 |

FOREIGN PATENT DOCUMENTS

| WO | WO 01/62022 A2 | 8/2001 |
|---|---|---|
| WO | WO 01/62022 A3 | 8/2001 |

OTHER PUBLICATIONS

European Search Report for patent application No. EP 03 00 3126, dated May 6, 2003, 3 pages.

* cited by examiner

SEARCHING RECEIVER

PRIORITY CLAIM

This application claims the benefit of European Patent Application No. 03003126.4, filed Feb. 13, 2003, in the European Patent Office. The entire disclosure of that application is incorporated herein by reference.

BACKGROUND OF THE INVENTION

1. Technical Field

The invention relates to a receiver and more particularly to a receiver that searches for a signal bearing desired content, while receiving selected content from a different signal.

2. Related Art

A receiver may include a tuner for selecting a specific frequency, channel, or program desired by an operator. An operator may tune a television or radio receiver to select a television program or radio station. The tuner receives the incoming signals and converts them to perceptible forms.

In some cases, however, desired programming is not always available. Mobile receivers are particularly susceptible to inconsistent availability of transmitted signals due to interference, fading, or other adverse conditions. A mobile television or telephone, for example, may experience a varying level of signal availability from a signal source.

FIG. 1 shows a transmitting station 102, a transmission region 104, and a vehicle 106 traveling along a path 108. The station 102 transmits programming of sufficient strength for the vehicle 106 to receive the programming from within the transmission region 104. The transmission region 104 may not have a smooth oval or circular shape as illustrated in FIG. 1 due to differences in geographical terrain, transmitter characteristics, environmental characteristics, and so on. Rather, the transition region 104 may vary in size and shape over time, further weakening the availability and integrity of a transmitted program.

In FIG. 1, the vehicle 106 cannot receive a desired program. As a result, the driver may be forced to select a different program transmitted from a different source, even though the driver may not want to listen to or watch another program. The iterative tuning and returning process may be unpleasant for the driver. Even when the driver successfully finds a desired program at an acceptable quality level, the driver may miss significant portions of the program due to the time and effort the driver must spend tuning that program. Additionally, each time a driver retunes a receiver, the driver may be distracted from traffic and road conditions which may create a safety hazard.

Therefore a need exists for a receiver that addresses the potential problems described above and others previously experienced.

SUMMARY

The invention provides a receiver that minimizes or substantially eliminates the process of tuning and returning a receiver to find desired programming. The receiver accepts program preferences or other selection information from the operator. When active, the receiver automatically monitors alternate frequencies for programming that matches the program preferences. Although one receiver may receive non-preferred programming, another receiver may scan alternate frequencies to determine the availability of programming that is of greater interest to the operator. When the receiver determines that a more preferred program is available, the receiver may alert the operator, and automatically tune the receiver to preferred programming. Alternatively, the receiver may prompt the operator to manually tune the receiver.

The receiver may include a selected program receiver, a program monitoring receiver, and a memory that stores program designation data. The selected program receiver employs a tuner to generate a program output signal for a currently selected program (which may be a disfavored program). The program monitoring receiver employs a tuner and comparison circuitry or logic to locate preferred programming. The program monitoring receiver may locate a designated program that matches program designation data. When the program monitoring receiver locates the designated program, it may employ signaling circuitry or logic to generate a designated program location signal. The location signal may alert an operator to the availability of the designated program at another frequency.

The receiver operates by reading program designation data from a memory and receiving, with the selected program receiver, a currently selected program. As the selected program receiver converts the selected program signal into a perceptible form, the program monitoring receiver locates a designated program that matches program designation data. When the designated program is available, the receiver advises the operator of its availability, automatically directs the selected program receiver to switch to the designated program, or may advise the operator of its availability and ask the operator if a switch should be made.

The receiver may include a first program receiver and a second program receiver. The receiver also may include a memory that stores program designation data, and a controller that directs the operation of the first and second program receivers. The controller causes the first receiver to receive and convert the signal into a perceptible form while the second receiver scans other frequencies to locate a designated program that matches a portion of the designation data. When desired programming is found, the second receiver receives the desired incoming signals and converts the incoming signals to perceptible forms, such as sound or light. The first receiver then scans a frequency range to locate a designated program. Accordingly, when the second receiver locates the designated program, the controller directs the first receiver to locate a subsequent designated program, while the second receiver continues to receive and process the designated program.

In operation, the controller directs the first program receiver to obtain and convert an incoming signal into a perceptible form. The controller also directs the second program receiver to search for a designated program matching the program designation data. During the search, the first program receiver obtains and presents the first program to the operator. When the second program receiver locates a designated program, the second program receiver ends its locating function and receives and converts the designated program to a perceptible form. The first program receiver then scans a frequency range to locate a next designated program.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
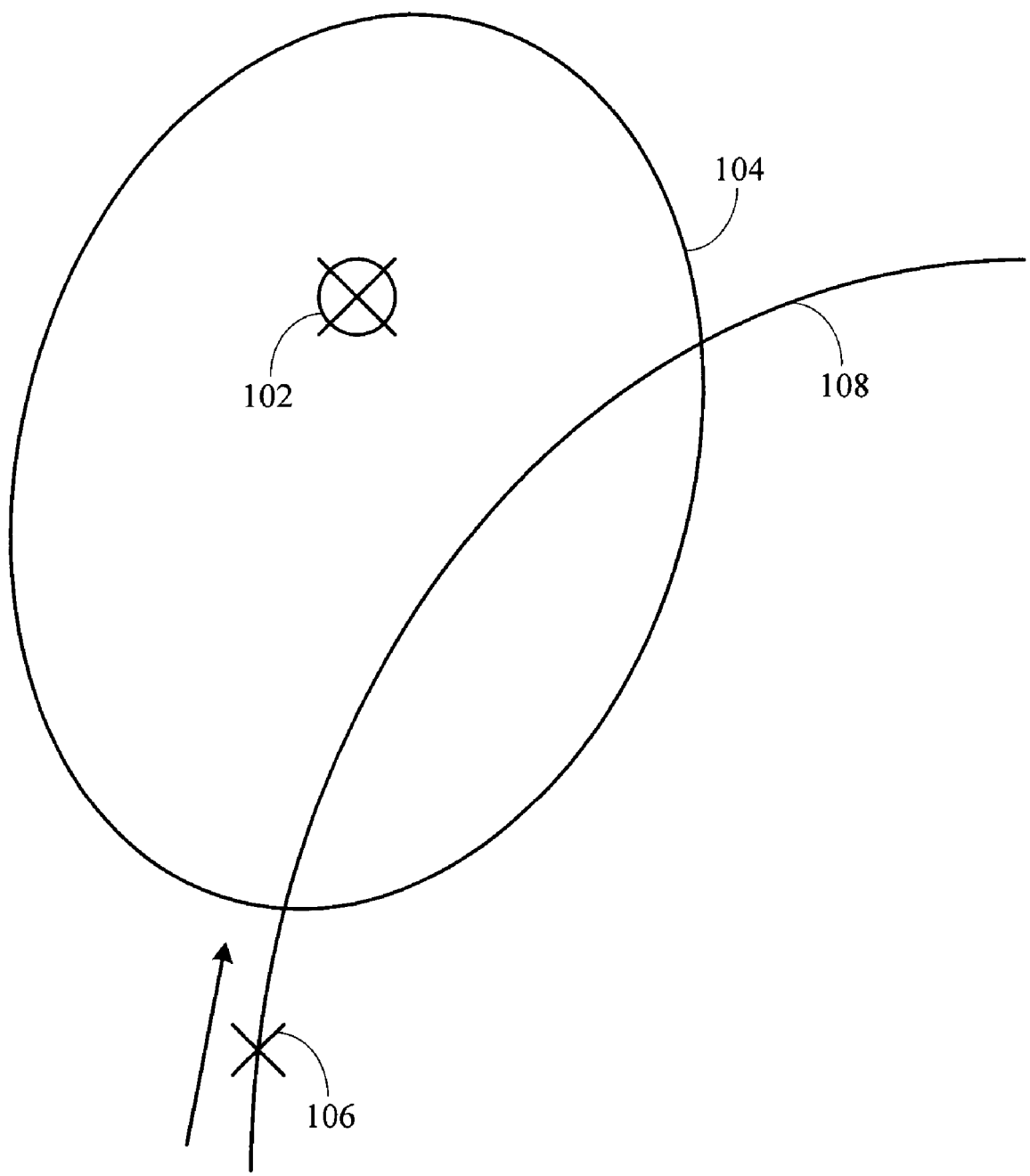
FIG. 1 is an example depiction signal availability with respect to a mobile receiver.
Figure 2:
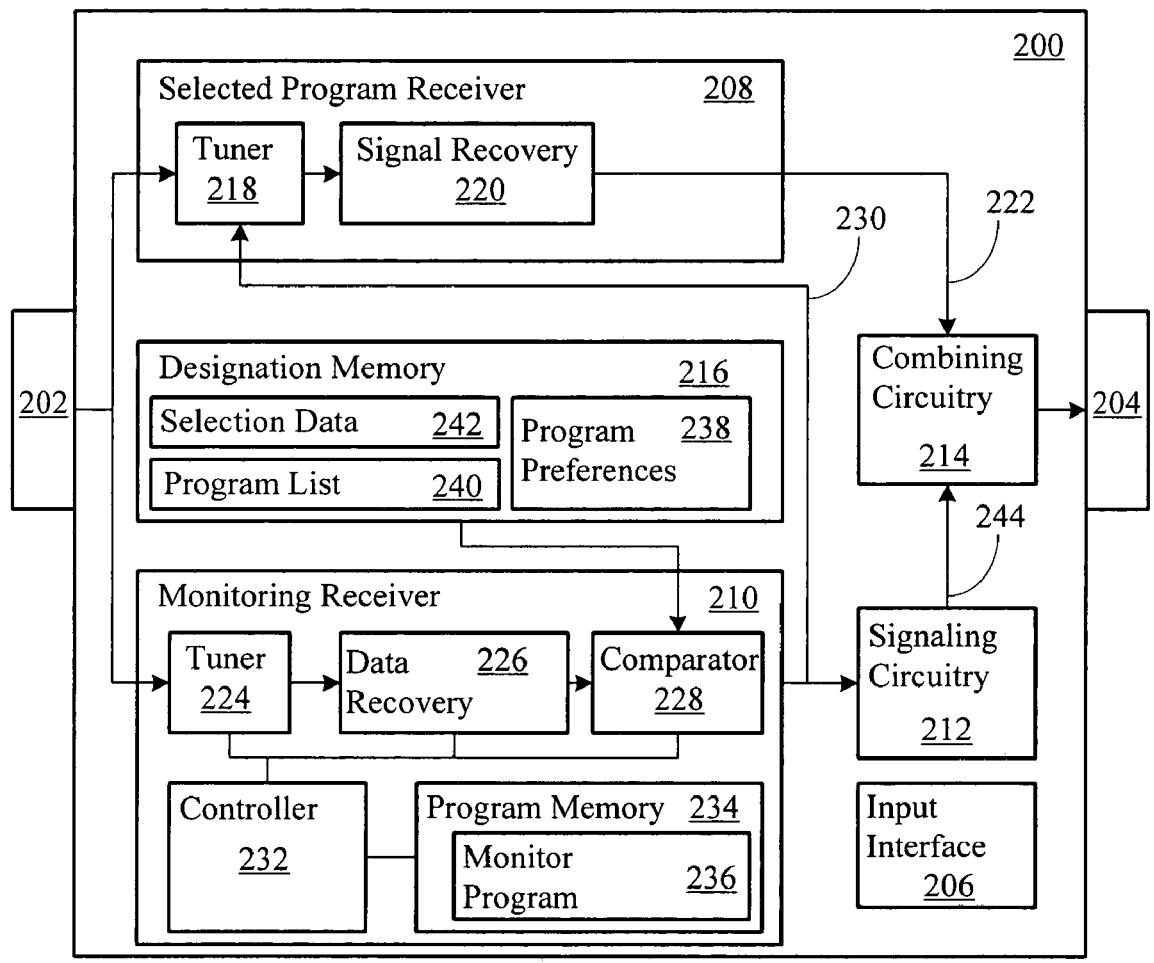
FIG. 2 is an example of a monitoring receiver and a selected program receiver.

FIG. 2 shows an exemplary receiver 200 having an input terminal 202, an output terminal 204, and an input interface 206. The receiver 200 includes a selected program receiver 208, a program monitoring receiver 210, signaling circuitry 212, and a signaling output 244.

The selected program receiver 208 includes a program tuner 218, signal recovery circuitry 220, and a program output 222. The program monitoring receiver 210 includes a monitoring tuner 224, data recovery circuitry or logic 226, and comparison circuitry or logic 228. As shown in FIG. 2, a controller 232 and a program memory 234 may be a unitary part of or interfaced to the monitoring tuner 224. The program memory 234 may include a monitoring program 236.

A designation memory 216 stores program designation data. The designation memory 216 may retain program preference data 238 and a program code list 240. The designation memory 216 also may store program selection characteristic data 242.

The output terminal 204 may deliver programming to an output device. Any output device may be used. The output device may be one or more speakers that receive an incoming program signal and convert the program signal to sound. The output device also may be a video device or display such as a television including a cathode ray tube or liquid crystal display. The video device may display audio/visual data encoded in a program output signal. Alternatively, the output device may convert an incoming signal into any perceptible form, such as sound or light.

The receiver 200 may receive many different types of signals. The receiver 200 may be an AM/FM receiver that selects a frequency and converts the audio programming encoded in that frequency to sound. The receiver 200 may be part of an automobile audio system or part of a home audio system.

The receiver 200 may be interfaced to or a unitary part of a television set. The receiver 200 may select and output audio/visual programming for a display. For discussion purposes, the receiver 200 is described in the context of a vehicle radio even though the receiver 200 is not limited to radio or television applications. Rather, the receiver 200 may be part of any application where multiple programs or information channels are present across a frequency spectrum, and where an operator desires an automated location of a preferred program.

The input terminal 202 provides a connection for an input signal that may bear programming of interest. The input terminal 202 may be an AM/FM or television antenna connector, for example. The input terminal 202 also may be a cable television connector, or another type of signal input connector.

An operator may control the receiver 200 through the input interface 206. The input interface 206 may be one or more depressible keys. The input interface 206 may vary widely in implementation, however, and also may include a touch pad or touch screen input, memory cards, disks, a voice recognition input, a trackball, a mouse, a remote control input, translating or rotating buttons or knobs, a graphical user interface, selectable icons, or other input devices. Furthermore, one or more separate devices may be used in combination.

In the selected program receiver 208, the program tuner 218 selects an FM frequency. The signal recovery circuitry 220 processes the selected frequency, deriving a program output signal. The program output signal may be processed by a mixer, a demodulator, and/or an amplifier that receives incoming signals and extracts information from those signals. The selected program receiver 208 provides the operator with a selected FM channel that may be heard through an output device connected to the output terminal 204.

The program monitoring receiver 210 receives and processes other incoming signals while the selected program receiver 208 provides the operator with a currently selected FM channel. The program monitoring receiver 210 may locate a designated program within the FM band that is different from the selected FM channel.

The controller 232 may control the monitoring receiver 210. The controller 232 executes a monitoring program 236 retained in the memory 234. The controller 232 may monitor and control the tasks implemented through a monitoring program 236.

The program monitoring receiver 210 may employ a monitoring tuner 224 that may select a signal within any frequency band. In the FM band, the data recovery circuitry 226 extracts identifying data from each selected FM channel. The data recovery circuitry 226 may include a Radio Data Service (RDS) decoder. The monitoring receiver 210 may store frequency, channel number, and signal strength of each FM channel and/or other signal parameters as the monitoring receiver checks the FM channel for designated programming.

The comparison circuitry 228, in turn, determines if the identifying data matches all or part of the program designation data stored in the designation memory 216. When the identifying data matches, the program monitoring receiver 210 drives a match signal on the comparison output 230. The match signal alerts the operator that a preferred program is available on another frequency channel.

The monitoring receiver 210 may periodically sweep a pre-selected frequency range (e.g., all or part of the FM band) for a designated program. The monitoring receiver 210 may sweep the frequency range once per minute, every five minutes, every 30 minutes, every hour, or according to any other timing schedule. Alternatively, the monitoring receiver 210 may randomly check one or more frequencies to look for a designated program or check a frequency or frequency range according to a pre-determined channel list. The monitoring receiver 210 may search for designated programs on a periodic basis, when instructed through the input interface 206, on a random basis, or according to any other schedule.

Identifying data from the FM channel may include Channel ID (CID) data, RDS data, Autofahrer Rundfunk Information (ARI) data, and other identifying information encoded within the FM signal. The identifying data may be a program code or other data that reveals the identity of the program, radio station, artist, genre, recording, or other characteristic currently present or transmitting in the FM band. The identifying information may include, from RDS data, the PS Name data, the PI Code data, and the RadioText data. The PS Name data provides an 8 digit alphanumeric program label (e.g., "_JAZZFM_", "SWR 3"), the PI Code provides a station identifying code that the receiver may search for when signal strength fades, and the RadioText data provides descriptive text information, for example, an artist name or recording name.

The program designation data stored in the designation memory 216 may represent operator preferred programming. For example, the program preference data 238 may specify one or more preferred frequencies (e.g., 101.3, 107.5, and 95.7 FM). Alternatively, the program preference data 238 may specify one or more preferred channel numbers. Alternatively or additionally, the program preference data 238 may include preferred program codes. The program codes may represent PS Name data, PI Code data, or RadioText data, or any other preference setting information. The operator may set the program code to "JAZZ" to specify that Jazz music is preferred. The operator may add RadioText data entries of "SongName1", "SongName2", and "NewsProgram1" to designate the transmission of SongName1, SongName2, or NewsProgram1 as preferred programs.

Similarly, the program designation data may include a program code list 240 stored in the receiver 200. The receiver 200 may be pre-programmed with the program code list 240, to program the receiver 200 to operate in a pre-determined geographical area based on radio stations assigned to that geographical area. The program code list 240 may include one or more program codes. Through the operator interface 206, the operator may select one or more preferred programming codes. The selected codes may be used as operator designated program codes that the receiver 200 uses to receive incoming signals.

The program designation data may include program selection characteristic data 242. The characteristic data 242 may capture the characteristics of the programming that an operator prefers. The receiver 200 may track the amount of time that the operator spends listening to any given frequency, channel, artist, program type, or other program characteristic. The tracked data may be stored in the designation memory 216 for comparisons when the monitoring receiver 210 attempts to locate preferred programming. The receiver 200 may compare the identifying information from an FM channel against the characteristic data 242. In such a comparison, the receiver 200 may determine whether the identifying data corresponds to a program that the operator has spent more than a pre-selected threshold of time listening to, and that, therefore, may be a designated program.

Alternatively, the characteristic data 242 may include a program selection count. The program selection count may represent a number of times that an operator has chosen a particular frequency, channel, artist, program type, or other program characteristic. The program selection count may be stored in the designation memory 216 for comparisons with the identifying information. When the selection count exceeds a pre-selected threshold, the receiver 200 may use the corresponding program as a designated program.

Alone or in conjunction with the program designation data described above, the signal strength of the FM channel may be evaluated. When preferred programming is available on another FM channel, if the strength of the FM channel is below a pre-set threshold, the receiver 200 may determine that the preferred programming is not available. Alternatively, the receiver 200 may indicate to the operator that the preferred programming is available, and indicate the strength of an incoming signal through an operator interface. An operator may generate an activation signal that instructs the receiver 200 to switch to the located preferred programming.

When the receiver 200 finds designated programming, the receiver 200 employs the signaling circuitry 212 to alert the operator to the designated signal using a designated program location signal. The signaling circuitry 212 may be visual circuitry such as a dashboard indicator, a panel light, a display driver that displays text, an icon displayed on an LCD screen, or other circuitry or logic that provides a visual indicator. The signaling circuitry 212 also may be an audio circuit that generates audible announcement such as a tone, chime or voice alert. The location signal may convey characteristics of the preferred programming, including an artist's name, song name, information type (e.g., "news" or "traffic information"), or any other characteristics.

The combining circuitry 214 may combine the location signal with the program output signal received by the selected program receiver 208. The combining circuitry 214 may combine the location signal with the program signal heard by an operator to alert the operator to the availability of a preferred program. The combining circuitry may add in an audible announcement "Preferred program SWR 3 is now available," into the audio stream for example.

In an alternative, the combining circuitry 214 may combine the location signal with a video output signal. The combining circuitry 214 may be an LCD that may display text characters or graphics through a video signal to indicate a designated program is available. The text or graphics may appear on an LCD display.

The operator may employ an operator interface 206 that indicates that the receiver 200 should switch to a preferred program that the monitoring receiver 210 located. The operator may push a selection button that produces a signal that activates the receiver 200. In response to the activation signal, the receiver 200 may retune the selected program receiver 208 to the designated programming located by the monitoring receiver 210.

Alternatively, the monitoring receiver 210 may communicate a station change command to the selected program receiver 208 through the comparison output 230. In this alternative, the selected program receiver 208 may automatically select the preferred programming when a command is received from the monitoring receiver 210. The operator may select an automatic switching through the input interface 206.

In some circumstances, the selected program receiver 208 may be turned OFF. Nevertheless, the monitoring receiver 210 may continue to search for preferred programming. The comparison output 230 also may include a power control signal or command that activates the output selected program receiver 208. After powering up, the selected program receiver 208 may automatically tune to the preferred programming located by the monitoring receiver 210.

The selected program receiver 208 may operate concurrently with the monitoring receiver 210. The receiver 200 may locate preferred programming while the receiver 200 receives and presents a different program to the operator. As shown in FIG. 2, the selected program receiver 208 receives the selected program, while the monitoring receiver 210 sweeps through a frequency range to locate designated programs that match the program designation data. The selected program receiver 208 may present the selected program to the operator in the "foreground" while the monitoring receiver 210 locates preferred programming in the "background". Furthermore, the monitoring receiver 210 may operate while the selected program receiver 208 or the receiver's outputs 200 are switched OFF.

The program designation data may include optional priority specifiers. The priority specifiers may include "high", "medium", and "low", or may specify a numeric value such as an integer between 1 for a high priority and 10 for a low priority. The priority specifiers may govern the order in which the monitoring receiver 210 presents located programming to the operator. A designated program with a higher priority that is available may be made available to the operator before a designated program with a lower priority is made available.

Figure 3:
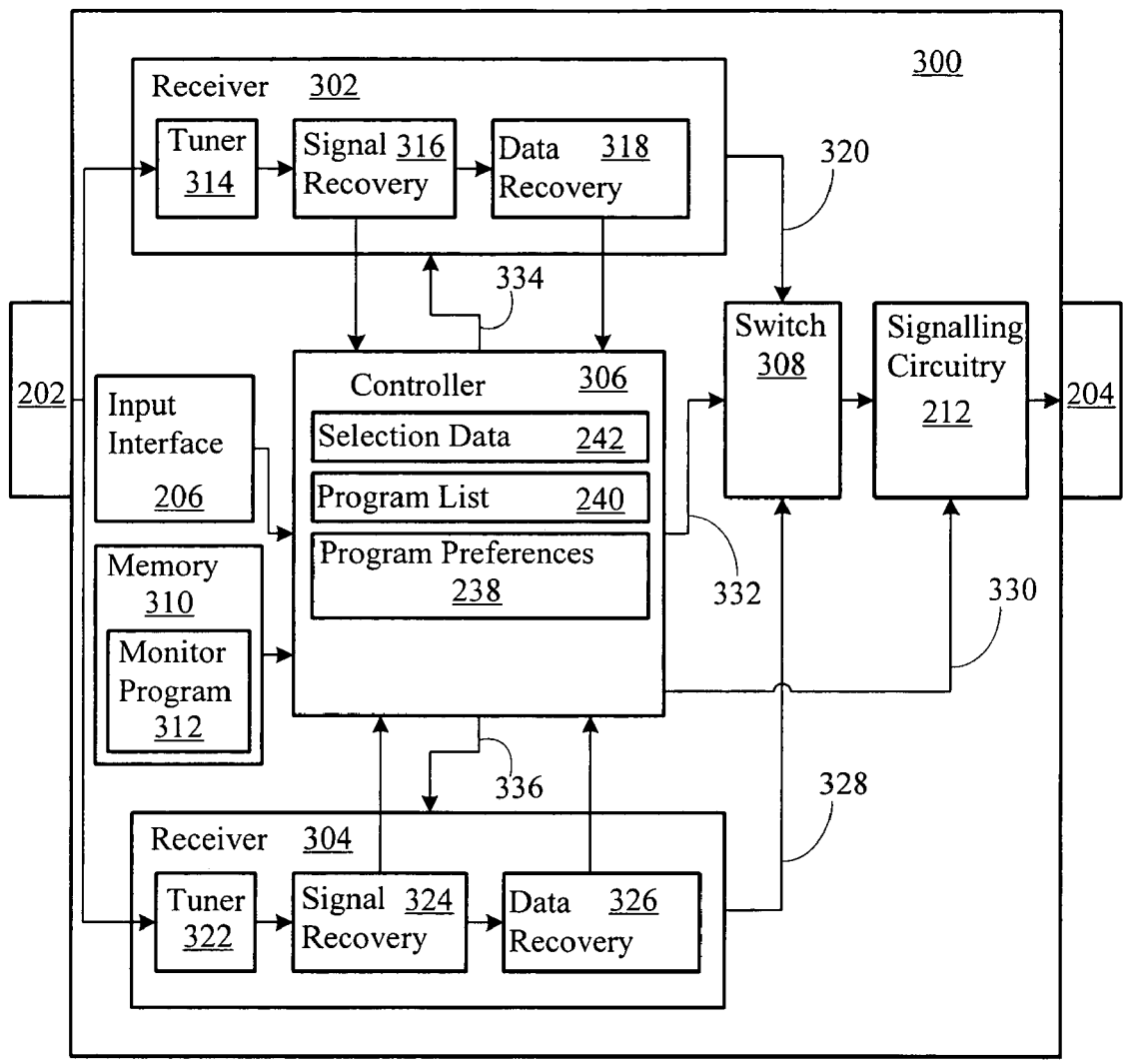
FIG. 3 is an example of two receivers that locate or receive a designated program.

FIG. 3 shows another exemplary implementation of a receiver 300. The receiver 300 includes an input terminal 202, an output terminal 204, and an input interface 206. The receiver 300 also includes a first receiver 302, a second receiver 304, a controller 306, signaling circuitry 212, a switch 308, and a memory 310.

The memory 310 stores a monitoring program 312. Designation data stored in the memory 310 also may include the program preference data 238, program code list 240, and program selection characteristic data 242. Alternatively, the designation data may be stored in a separate memory (e.g., onboard the controller 306).

The first receiver 302 includes a tuner 314, signal recovery circuitry 316, and data recovery circuitry 318. The first receiver also includes a first program output 320. The first program output 320 is connected to the switch 308. Similarly, the second receiver 304 includes a tuner 322, signal recovery circuitry 324, and data recovery circuitry 326. The second receiver 304 includes a second program output 328 that is connected to the switch 308. The first receiver 302 and second receiver 304 may be implemented in a similar manner.

The controller 306 includes a signaling control output 330 and a switch control output 332. In addition, the controller 306 directs operation of the first receiver 302 through the first receiver control outputs 334. The controller 306 directs operation of the second receiver 304 through the second receiver control outputs 336.

The output terminal 204 delivers selected programming to an output device. The output device may comprise many devices. The output device may be a speaker system that converts a program output signal to an acoustic or visual signal.

The receiver 300 may receive many different types of signals. The receiver 300 may be an AM/FM receiver that selects and outputs audio programming or may be a television receiver. The receiver 300 described below is configured to receive FM signals within a vehicle. The receiver 300 also may receive many other signals.

The input terminal 202 provides a connection for an input signal encoded with multiple programming channels. The input terminal 202 may be an FM antenna. At different times, each FM channel may encode programming of interest.

The first receiver 302 and second receiver 304 may assume interchangeable operations. The first receiver 302 and the second receiver 304 may perform a selected program operation or a location operation. When the first receiver 302 performs the selected program operation, the first receiver 302 employs the first tuner 314 to tune to a currently selected FM frequency. The signal recovery circuitry 316 processes the selected FM frequency to derive a program output signal for the program output 320. The signal recovery circuitry 316 may include a mixer, a demodulator, and an amplifier to receive incoming radio signals and convert them to perceptible forms.

By performing the selected program operation, the first receiver 302 receives incoming signals and converts them to a perceptible form. While processing the incoming signals, the second receiver 304 may perform a location operation. The second receiver 304 may employ a second tuner 322 to locate alternative programming.

The first receiver 302 and the second receiver 304 operate under the direction of the controller 306. The controller 306 executes the monitoring program 312 retained in the memory 310. The controller 306 may communicate with the first receiver 302 over the control outputs 334 and with the second receiver 304 over the control outputs 336. The control outputs 334 and 336 may carry commands for the receivers 302 and 304. The commands may include tuning commands to direct the receivers 302 and 304 to tune to a particular frequency or a channel or data commands that direct the receivers to extract data from an incoming radio signal.

While the first receiver 302 engages in selected program operations, the second receiver 304 may engage in monitoring operations to evaluate any frequency. For each selected FM channel, the data recovery circuitry 326 may extract identifying data from the FM channel. The data recovery circuitry 326 may be a Radio Data Service (RDS) decoder. Similarly, the second receiver 304 may store signal parameters including frequency, channel number, and a signal strength indicator of each FM channel as it evaluates the FM channel for designated programming.

Under the direction of the controller 306, the second receiver 304 communicates the identifying data to the controller 306. The controller 306 may then determine whether the identifying data matches all or part of the program designation data. The controller 306 may read all or part of the designation data including the program preference data 238, program code list 240, and program selection characteristic data 242 and match the identifying data to the designation data.

The receiver 300 may sweep a pre-selected frequency range to check each channel in the frequency range for a designated program periodically or randomly. The receiver performing the location operation may sweep the frequency range at predetermined intervals, or according to a frequency list of one or more frequencies for the presence of the designated program. The receiver performing a location operation may search for designated programs on a periodic basis, when instructed through the input interface 206, on a random basis, or based on any programmed schedule.

The receiver 300 may instruct the receivers 302 and 304 to decode the same identifying data employed by the receiver 200. Accordingly, the controller 306 may receive RDS data, ARI data, or any other identifying data from the receivers 302 and 304. The controller 306 may determine the availability of a designated program by matching the identifying data against the types of program designation data. The controller 306 may match the identifying data to the program preference data 238, program code list 240, and/or the selection characteristic data 242, with or without reference to a signal strength.

When the controller 306 finds preferred programming, the controller 306 activates the signaling circuitry 212 to alert the operator through the signaling control output 330. The signaling circuitry may generate a designated program location signal that may take a visual or audible form. The controller 306 may activate video signaling circuitry such as an LCD controller to display text or graphics. Similarly, the controller 306 may activate audio signaling circuitry such as an audio circuit that generates an audible announcement, such as a tone, or a voice alert. The receiver 300 may further be a unitary part of or interface with the combining circuitry 214 that merges the location signal with the program output. The location signal may convey characteristics of the preferred programming, including an artist name, song name, information type (e.g., "news" or "traffic information"), and/or other characteristics.

While the receiver 302 engages in selected program operations, the controller 306 directs the switch 308 to pass the program signal on the first program output 320. The switch 308 may operate under the control of the switch control output 332 to select between the first program output 320 and the second program output 328. The switch 308 may be an analog multiplexer or another type of switch.

When directed by the controller 306, the first and second receivers 302 and 304 may reverse operations. The first receiver 302 receives a selected program, and the second receiver 304 first locates designated programs. When the second receiver 304 locates a designated program, the controller 306 may direct the second receiver 304 to receive the designate program, and direct the first receiver 302 to locate alternative designated programs.

The first receiver 302 then searches for a subsequent designated program, while the second receiver 304 continues to receive the designated program. The controller 306 may set a switch to pass the designated program to the second program output 328.

In one implementation, the controller 306 switches the receiver operations automatically. Alternatively, the controller 306 may issue a request authorization to switch programs through an operator interface 206. The controller 306 also may direct a selected program receiver to tune to the designated program, and maintain the other receiver as a location receiver.

As FM channel reception varies, the first receiver 302, now switched to location operation, may find a different preferred program. In response, the controller 306 may switch the receiver operations again. The first receiver 302 may become the selected program receiver, and the second receiver 304 may become the location receiver. In each instance, the controller 306 directs the switch 308 to pass the program signal obtained by the selected program receiver.

Figure 4:
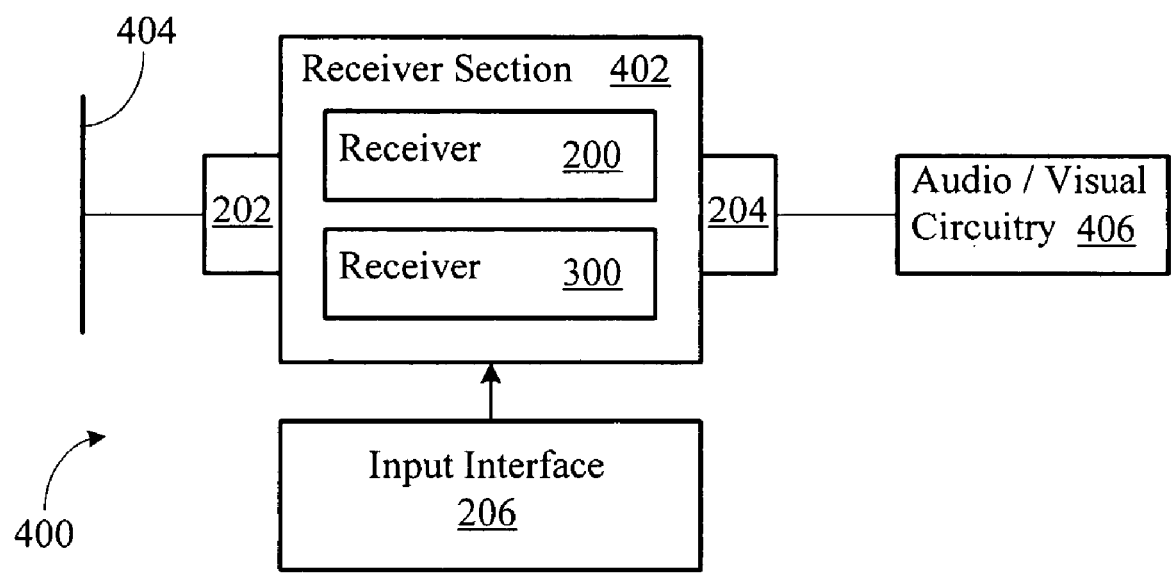
FIG. 4 is an example of a communication device.

FIG. 4 shows an exemplary communication device 400 that may incorporate one or both of the receivers 200 or 300 shown in FIG. 2 or FIG. 3. The communication device 400 includes a receiver section 402, an input connector 202, and an output connector 204. An operator input interface 206 provides operator input to the receiver section 402. In addition, an antenna 404 connects to the input connector 202, and audio/visual circuitry 406 connects to the output connector 204.

The communication device 400 may be a television set, or any other visual and/or audio device. When part of a television set, the communication device 400 generates video and audio data sourced to the audio/visual circuitry 406. The audio/visual circuitry 206 may be a display, and may include speakers or a separate audio output. When part of an AM/FM radio, the communication device 400 generates audio data sourced to the audio/visual circuitry 406. The circuitry 406 may include one or more speakers.

The communication device 400 is not limited to any particular device. The communication device 400 may comprise a personal data assistant, a citizens' band radio, or other any other personal electronic communication device.

Figure 5:
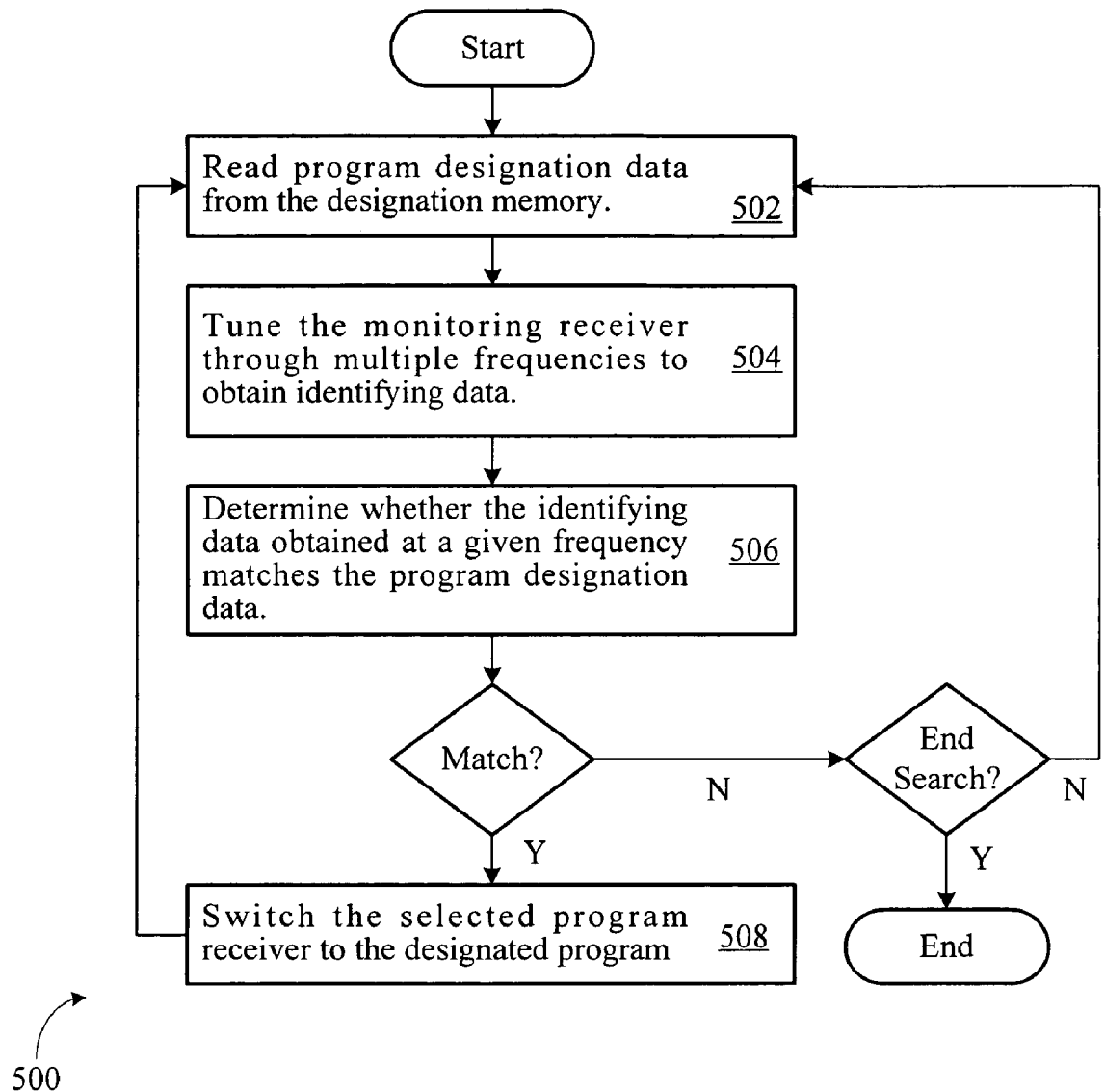
FIG. 5 is an example of a flow diagram for process that a receiver may implement to receive or locate a designate program.

FIG. 5 is a flow diagram 500 of the acts that may be encompassed within the monitoring program 236. The controller 232 reads program designation data from the designation memory 216 (Act 502). The program designation data may include program preference data 238, program code list 240, and program selection characteristic data 242. As the selected program receiver 208 receives and converts the incoming signals to a perceptible form, the controller 232 tunes the monitoring receiver 210 through a frequency band to obtain identifying data (Act 504).

At each designated frequency, the controller 232 determines whether identifying data matches the program designation data (Act 506). The controller 232 may find a match from the comparison circuitry 228, or may perform the comparison under programmed control. When the controller 232 determines that the designated program is available, the controller 232 automatically switches the selected program receiver 208 to the designated program (Act 508). Alternatively, the controller 232 may first request an authorization to the switch.

Figure 6:
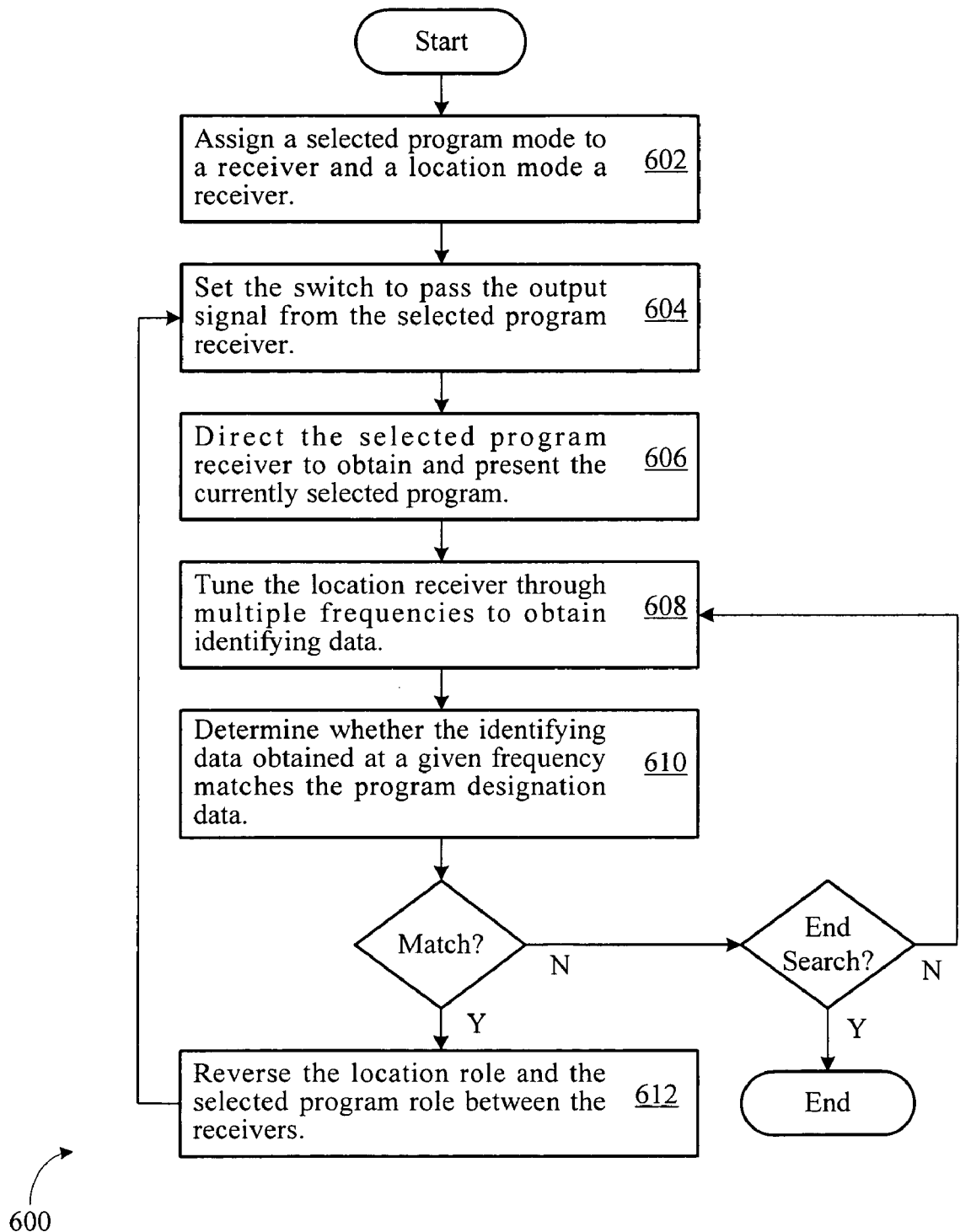
FIG. 6 is an example of a flow diagram for a process that a receiver may implement to interchange reception and location operation.

FIG. 6 is a flow diagram 600 of further acts that may be encompassed within the monitoring program 312. The controller 306 directs a first receiver to operate in a selected program mode and directs a second receiver to operate in a location mode (Act 602). The controller 232 sets a switch 308 to pass the output signal from the selected program receiver (Act 604). The controller 306 directs the selected program receiver to obtain and present the currently selected program to the operator (Act 606).

In addition, the controller 306 may direct the location receiver to tune to multiple frequencies and obtain corresponding identification data (Act 608). The controller 306 may direct the second program receiver 304 to scan one or more frequencies to locate a designated program. At each frequency, the controller 306 determines whether the identifying data matches the program designation data (Act 610).

When the controller 306 determines that the designated program is available, the controller 232 reverses the location operation and the selected program operation between the receivers (Act 612). The controller 232 directs the prior location receiver operate as the selected program receiver to receive incoming signals and convert them to perceptible form. Accordingly, the controller 232 sets the switch 308 to pass the output signal from the new selected program receiver.

The implementations are not limited to the particular forms described above. Any suitable implementation can be used. Although selected features of the implementations are stored in the memory 234 and 310, all or part of systems and methods may be received, stored in, or read from other machine-readable media. Secondary storage devices also may be used such as hard disks, floppy disks, and CD-ROMs, ROM or RAM including DRAM, SRAM, Flash or other types of memory. The monitoring programs 236 and 312 may be a single program, separate programs, or distributed across several memories and processors.

Many other variations are also possible. For example, the controller 232 or controller 306 may be a processor, microcontroller, application specific integrated circuit (ASIC), discrete logic, or a combination of other types of logic or circuits. The controllers 232 and 306 may be associated with different circuitry or logic blocks than those shown in the Figures. Similarly, the memory 234 and 310 may be DRAM, SRAM, Flash or any other type of memory. As another example, the monitoring programs 236 and 312 may be a single program, separate programs, or a distributed program across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A receiver comprising:
   a monitoring receiver tuner that receives a first incoming signal;
   a selected program receiver tuner;
   a comparison output coupled to the selected program receiver tuner;

a controller coupled to the monitoring receiver tuner and the comparison output;

the monitoring receiver tuner operable to scan a frequency range to identify availability of an operator designated program in the first incoming signal;

the controller operable to recognize the availability of the operator designated program, and further operable to generate a power control signal on the comparison output coupled to the selected program receiver tuner in response to the availability of the operator designated program; and the selected program receiver tuner operable to automatically turn ON in response to the power control signal that the controller generated in response to the availability of the operator designated program, and further operable to receive the operator designated program.

2. The receiver of claim 1, further comprising data recovery circuitry coupled to the controller to extract identifying data from the first incoming signal.

3. The receiver of claim 2, further comprising a memory storing program designation data for a comparison to the identifying data.

4. The receiver of claim 3, where the program designation data comprises operator preferred program codes.

5. The receiver of claim 3, where the program designation data comprises at least one of a program selection count and a program selection time.

6. The receiver of claim 1, further comprising combining circuitry coupled to the controller that combines the first incoming signal with an availability signal.

7. The receiver of claim 1, further comprising an operator interface operable to:

report signal strength of the operator designated program located in the first incoming signal; and accept an activation signal that directs the receiver to switch reception to the first incoming signal.

8. A receiver comprising:

a memory storing program designation data;

a selected program receiver comprising:
  a program tuner; and
  a program output coupled to the program tuner for conveying a program output signal;

a program monitoring receiver coupled to the memory and operable to locate a designated program matching at least a portion of the program designation data, the program monitoring receiver comprising:
  a monitoring tuner;
  comparison circuitry coupled to the monitoring tuner;
  a comparison output coupled to the comparison circuitry and to the selected program receiver; and
  the program monitoring receiver operable to generate a power control signal on the comparison output when the program monitoring receiver locates the operator designated program;

the selected program receiver operable to automatically turn ON in response to the power control signal and receive the operator designated program; and signaling circuitry coupled to the comparison output, the signaling circuitry comprising a signaling output for carrying a designated program location signal.

9. The receiver of claim 8, where the program designation data comprises operator specified program preference data.

10. The receiver of claim 9, where the program preference data comprises at least one program code.

11. The receiver of claim 8, where the program designation data comprises at least one of a program selection count and a program selection time.

12. The receiver of claim 8, further comprising combining circuitry coupled to the program output and the signaling circuitry, where the combining circuitry combines the designated program location signal with the program output signal.

13. A receiver comprising:

a first program receiver comprising:
  a first tuner; and
  a first program output for carrying a first program output signal processed by the first tuner a second program receiver comprising:
  a second tuner; and
  a second program output for carrying a second program output signal;

a memory storing program designation data; and a controller coupled to the memory, the first program receiver, and the second program receiver, the controller operable to:
  cause the second program receiver to locate a first designated program that matches at least a portion of the designation data while the first program receiver is turned OFF; and
  cause the first program receiver to automatically turn ON when the second program receiver locates the first designated program.

14. The receiver of claim 13, where the controller is further operable to, when the second program receiver locates the first designated program:

cause the second program receiver to receive the first designated program; and cause the first program receiver to locate a second designated program while the second program receiver receives the first designated program.

15. The receiver of claim 13, further comprising signaling circuitry coupled to the controller.

16. The receiver of claim 13, where the program designation data comprises at least one of a program code list, program selection count and a program selection time.

17. A computer readable medium encoded with computer executable instructions that cause receivers to perform a method comprising:

locating a designated program with a second program receiver that matches program designation data to identify availability of a first designated program;

when the second program receiver locates the first designated program:
  automatically turning ON a first program receiver;
  tuning the second program receiver to receive the first designated program; and
  interchanging search and reception operations of the first and second program receiver so that the first program receiver begins to search for a second designated program while the second program receiver receives the first designated program; and determining when the second designated program is available and in response;
  tuning the first program receiver to receive the second designated program; and
  interchanging search and reception operations of the first and second program receiver so that the second program receiver begins to search for a third designated program while the first program receiver receives the second designated program.

18. The computer readable medium of claim 17, where the program designation data comprises at least one operator specified program code.

19. The computer readable medium of claim 17, where locating a designated program comprises the act of sweeping at least one of a television and a radio frequency range.

20. The computer readable medium of claim 17, where the executable instructions further cause the signal receiver to:

report signal strength of the designated program; and
receive an activation signal that directs a receiver to switch reception to the designated program.

* * * * *